US011017538B2

(12) United States Patent
Zhang et al.

(10) Patent No.: US 11,017,538 B2
(45) Date of Patent: May 25, 2021

(54) MULTIPLE OBJECT TRACKING

(71) Applicant: Microsoft Technology Licensing, LLC, Redmond, WA (US)

(72) Inventors: Dianmu Zhang, Redmond, WA (US); Ilya Zharkov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 23 days.

(21) Appl. No.: 16/662,277

(22) Filed: Oct. 24, 2019

(65) Prior Publication Data

US 2021/0125344 A1    Apr. 29, 2021

(51) Int. Cl.
*G06T 7/00* (2017.01)
*G06T 7/246* (2017.01)

(52) U.S. Cl.
CPC .... *G06T 7/248* (2017.01); *G06T 2207/20081* (2013.01); *G06T 2207/20084* (2013.01)

(58) Field of Classification Search
CPC ........... G06T 7/248; G06T 2207/20084; G06T 2207/20081
See application file for complete search history.

(56) References Cited

U.S. PATENT DOCUMENTS

| 8,718,363 | B2 | 5/2014 | Desai et al. |
| 9,443,320 | B1* | 9/2016 | Gaidon ................ G06K 9/3233 |
| 10,019,631 | B2 | 7/2018 | Tao et al. |
| 10,332,264 | B2* | 6/2019 | Schulter ............... G06K 9/6274 |
| 2019/0132709 | A1 | 5/2019 | Graefe et al. |
| 2019/0147372 | A1 | 5/2019 | Luo et al. |

OTHER PUBLICATIONS

Battaglia, et al., "Relational Inductive Biases, Deep Learning, and Graph Networks", In the Repository of arXiv:1806.01261, Jun. 4, 2018, 37 Pages.
Bergmann, et al., "Tracking Without Bells and Whistles", In the Repository of arxiv:/1903.05625v1, Mar. 13, 2019, 15 Pages.
Chopra, et al., "Learning a Similarity Metric Discriminatively, with Application to Face Verification", In Proceedings of IEEE Computer Society Conference on Computer Vision and Pattern Recognition, vol. 1, Jun. 20, 2005, 8 Pages.
Deng, et al., "Arcface: Additive Angular Margin loss for Deep Face Recognition", In Proceedings of the IEEE Conference on Computer Vision and Pattern Recognition, 2019, pp. 4690-4699.

(Continued)

*Primary Examiner* — Ping Y Hsieh
(74) *Attorney, Agent, or Firm* — Holzer Patel Drennan

(57) ABSTRACT

A multiple-object tracking system includes a convolutional neural network that receives a set of images of a scene that have each been extracted from a frame of a scene. Each of the images corresponds to a detected instance of one of multiple objects that appears in the scene. The convolutional neural network computes, for each image of the set, an appearance embedding vector defining a set of distinguishing characteristics for the image, and a graph network then modifies the appearance embedding vector for each image based on determined relationships between the image and a subset of the images corresponding to detection times temporally separated from a detection time. The modified appearance embedding vectors are then used to identify subsets of the images corresponding to identical targets.

20 Claims, 7 Drawing Sheets

(56) References Cited

OTHER PUBLICATIONS

Gao, et al., "Graph Convolutional Tracking", In Proceedings of the IEEE Conference on Computer Vision and Pattern Recognition, Jun. 16, 2019, pp. 4649-4659.

Gordon, et al., "Re3: Re Al-Time Recurrent Regression Networks for Visual Tracking of Generic Objects", In IEEE Robotics and Automation Letters, vol. 3, Issue 2, Apr. 2018, pp. 788-795.

Gunduz, et al., "A lightweight Online Multiple Object Vehicle Tracking Method", Published in IEEE Intelligent Vehicles Symposium (IV), Jun. 26, 2018, pp. 427-432.

Hoffer, et al., "Deep Metric Learning Using Triplet Network", In Proceedings of International Conference on Learning Representations, May 7, 2015, 8 Pages.

Liu, et al., "SSD: Single Shot MultiBox Detector", In Proceedings of 14th European Conference on Computer Vision, Sep. 17, 2016, 17 Pages.

Nguyen, et al., "Spatio-Temporal Context for Robust Multitarget Tracking", Published in Journal of IEEE Transactions on Pattern Analysis and Machine Intelligence, vol. 29, Issue 1, Jan. 2007, 13 Pages.

Parkhi, et al., "Deep Face Recognition", Published in British Machine Vision, vol. 1, Issue 3, Sep. 7, 2015, 12 Pages.

Redmon, et al., "You Only Look Once: Unified, Real-Time Object Detection", In Proceedings of IEEE Conference on Computer Vision and Pattern Recognition, Jun. 27, 2016, pp. 779-788.

Russakovsky, et al., "ImageNet Large Scale Visual Recognition Challenge", In International Journal of Computer Vision, vol. 115, Issue 3, Dec. 2015, 37 Pages.

Sadeghian, et al., "Tracking the Untrackable: Learning to Track Multiple cues with Long-term Dependencies", In Proceedings of the IEEE International Conference on Computer Vision, Oct. 22, 2017, pp. 300-311.

Schroff, et al., "FaceNet: A Unified Embedding for Face Recognition and Clustering", In Proceedings of IEEE Conference on Computer Vision and Pattern Recognition, Jun. 7, 2015, pp. 815-823.

Shah, et al., "Robust Continuous Clustering", In Proceedings of the National Academy of Sciences, vol. 114, No. 37, Sep. 12, 2017, pp. 9814-9819.

Taigman, et al., "DeepFace: Closing the Gap to Human-Level Performance in Face Verification", In Proceedings of IEEE Conference on Computer Vision and Pattern Recognition, Jun. 23, 2014, pp. 1701-1708.

Tang, et al., "Multiple People Tracking by Lifted Multicut and Person Reidentification.", In Proceedings of IEEE Conference on Computer Vision and Pattern Recognition, Jul. 21, 2017, pp. 3701-3710.

Wang, et al., "Additive Margin Softmax for Face Verification", Published in IEEE Signal Processing Letters, vol. 25, Issue 7, Jul. 2018, pp. 926-930.

Wang, et al., "Cosface: Large Margin Cosine Loss for Deep Face Recognition", In Proceedings of the IEEE Conference on Computer Vision and Pattern Recognition, Jun. 18, 2018, pp. 5265-5274.

Wang, et al., "Non-local Neural Networks", Proceedings of the IEEE Conference on Computer Vision and Pattern Recognition, Jun. 18, 2018, pp. 7794-7803.

Xiang, et al., "Learning to Track: Online Multi-Object Tracking by Decision Making", In Proceedings of the IEEE International Conference on Computer Vision, Dec. 7, 2015, pp. 4705-4713.

Babaee, et al., "A Dual CNN—RNN for Multiple People Tracking", In Journal of Neurocomputing, vol. 368, Aug. 12, 2019, pp. 69-83.

Ma, et al., "Deep Association: End-to-end Graph-Based Learning for Multiple Object Tracking with Conv-Graph Neural Network", In Proceedings of the International Conference on Multimedia Retrieval, Jun. 10, 2019, pp. 253-261.

"International Search Report and Written Opinion Issued in PCT Application No. PCT/US20/055869", dated Feb. 2, 2021, 13 Pages.

\* cited by examiner

400

|     | | D1 | D2 | D3 | D4 | D5 | D6 | D7 |
|-----|---|-----|-----|-----|-----|-----|-----|-----|
| D1  | | +1 | -.75 | +.99 | -.65 | -.85 | -.90 | -.70 |
| D2  | | -.75 | +1 | -.83 | -.83 | +.97 | +.99 | -.92 |
| D3  | | +.99 | -.83 | +1 | -.91 | -.97 | -.90 | -.84 |
| D4  | | -.65 | -.83 | -.91 | +1 | -.95 | -.88 | +.97 |
| D5  | | -.85 | .97 | -.97 | -.95 | +1 | +.99 | -.98 |
| D6  | | -.90 | +.99 | -.90 | -.88 | +.99 | +1 | -.91 |
| D7  | | -.70 | -.92 | -.84 | +.97 | -.98 | -.91 | +1 |

MULTIPLE OBJECT TRACKING

SUMMARY

According to one implementation, a multiple-object tracking system includes a convolutional neural network that receives a set of images ("detections") that each correspond to a detected instance of one of multiple objects from an individual frame of a multi-frame scene. The convolutional neural network computes, for each image of the set, an appearance embedding vector defining a set of distinguishing characteristics for each detection. A graph network modifies the appearance embedding vector for each detection based on determined relationships between the detection and a subset of other detections. The modified appearance embedding vectors are then used to identify subsets of detections corresponding to identical targets.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 4 illustrates exemplary table generated based on actions performed by a graph network included within a multiple object tracking system.

DETAILED DESCRIPTION

Figure 1:
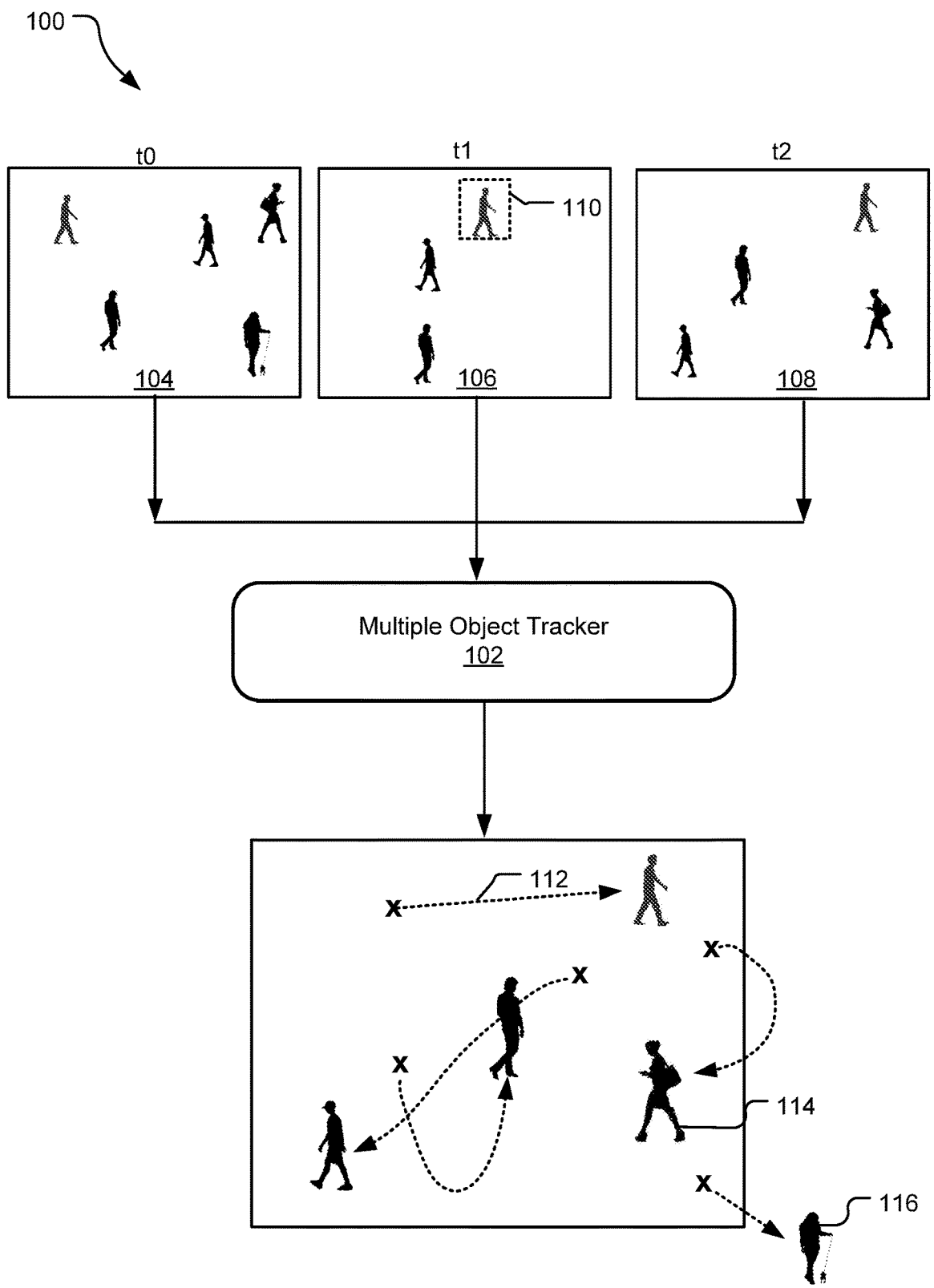
FIG. 1 illustrates an object tracking system for simultaneously tracking multiple targets that move throughout a scene.

Existing object-tracking technologies are well-suited for tracking of individual objects but do not perform as well when used in tracking scenarios with multiple moving objects in a same scene. In some technologies, multi-object tracking is performed by instantiating and manually initiating a tracking code with respect to each object detected in a scene (e.g., if there are 60 people, 60 different tracklets and tracks may be instantiated). Manually initializing large numbers of tracks is error-prone, and objects that appear after an initial frame may not be tracked unless such tracking is again manually initialized for the later frame(s) where the objects appear. This is further complicated by potential interactions between moving objects. For instance, objects may temporarily occlude or move in and out of a field-of-view of a camera. This leads to scenarios with disappearing and reappearing objects that may be incorrectly identified.

The disclosed multi-object-tracking technology leverages image feature distinguishing capabilities of a convolutional neural network along with differential clustering capabilities of a graph network to cluster together detections that corresponding to identical objects, enabling simultaneously tracking of multiple different objects within a scene. According to one implementation, an appearance embedding networks (e.g., a convolutional neural network (CNN)) is employed to analyze imagery and define distinguishing characteristics for each of multiple pre-detected objects of interest (referred to herein as "detections") within a scene. The distinguishing characteristics of each detection are then are provided, along with other detection properties (e.g., temporal and spatial information) to a graph network.

The graph network is, in one implementation, trained to apply a differentiable clustering algorithm that modifies the distinguishing characteristics of each individual detection based on determined similarities and dissimilarities (e.g., spatial similarities and visual similarities) to other detections in the same scene corresponding to one or more different points in time. For example, the distinguishing characteristics of a given detection may be modified based on the distinguishing characteristics of the subjective future or past instances of all objects in the scene. By refining the distinguishing characteristics of each detection based on relative position and visual similarity to other temporally-separated detections, more sensitive and accurate features can be captured in the embeddings used for target identification. Ultimately, this methodology reduces the computational complexity needed to simultaneously track multiple objects by eliminating the need to track objects independent of one another and instead, using the inter-relations between detections (e.g., spatial, visual, and temporal similarities and differences) to enhance the distinguishing characteristics of each individual detection. The enhancement of distinguishing characteristics of each detection in this manner reduces instances of target misidentifications and computer-realized tracking errors.

FIG. 1 illustrates an object tracking system 100 for simultaneously tracking multiple targets that move throughout a scene. The object tracking system 100 includes a multiple object tracker 102 that receives as input a series of time-separated frames (e.g., images) of a same scene. Although the multiple object tracker 102 may receive any number of such frames, FIG. 1 illustrates three such frames for simplicity—e.g., frames 104, 106, and 108. The frames 104, 106, and 108 may be understood as corresponding to a sequential times t0, t1, and t2, respectively. Upon receiving the frames 104, 106, and 108 as input, the multiple object tracker 102 analyzes each of the frames to identifies instances of targets that satisfy predefined criteria. In different implementations, the targets may assume different forms including for example, people, animals, cars, etc.

In the exemplary scene shown, there are five different targets of a same class (e.g., different people) that appear in the scene in at least one of the three exemplary frames. Some of the same targets appear in multiple frames. The multiple object tracker 102 initially identifies all objects in each frame satisfying some predefined criteria pertaining to target type. For example, the multiple object tracker 102 detects all people in a scene, all cars, all objects of interest, etc. By performing various actions described in greater detail with respect to FIG. 2-5, below, the multiple object tracker 102 determines which of the individual detections and their locations correspond to a same target such that the target can then be "tracked" by virtue of the relative movement of its associated detections.

In one implementation, the multiple object tracker 102 includes an appearance embedding network (e.g., a convolutional neural network (CNN)) that computes convolutional layers to compute/extract distinguishing characteristics of each detection and then modifies those distinguishing characteristics based on determined similarities (e.g., visual similarities, spatial similarities, and/or temporal similarities) to other detections identified within the same scene. For example, the distinguishing characteristics of each detection are represented as one or more vectors.

According to one implementation, the multiple object tracker 102 includes a graph neural network (not shown) that is trained to modify the distinguishing visual characteristics of a detection to be more similar to other detections of the same real-world target while simultaneously decreasing the similarity between those distinguishing visual characteristics and the distinguishing visual characteristics of the scene corresponding to different real-world targets.

In one implementation, multiple object tracker 102 outputs modified distinguishing characteristics that can be used to perform detection clustering with a level of accuracy that is more reliable than existing methods. For example, detection clustering may be employed to group together detections with similar distinguishing characteristics such that each different cluster of detections may be understood as including different detections of the same target. Consequently, information output by the multiple object tracker 102 is therefore usable to determine a trajectory (e.g., a trajectory 112) for each target in the scene, even if that target is temporarily occluded or moves out of the scene at some point in time within the frame (e.g., as shown by exemplary targets 114, 116).

Figure 2:
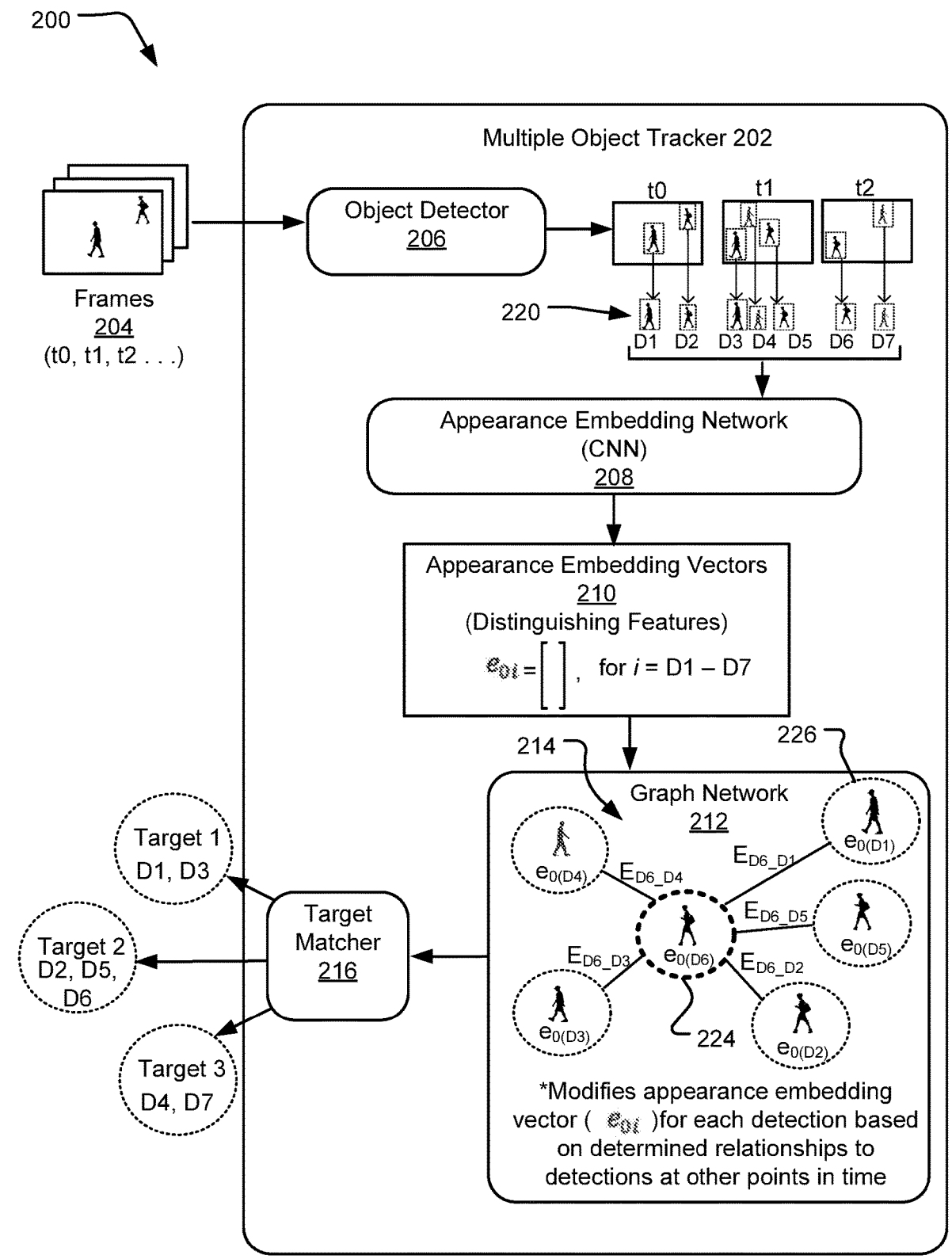
FIG. 2 illustrates another example object tracking system that simultaneously tracks multiple ambient targets throughout a scene.

FIG. 2 illustrates another example object tracking system 200 that simultaneously tracks multiple ambient targets throughout a scene. The object tracking system 200 includes a multiple object tracker 202 that receives as input a series of frames 204, which may be understood as including time-separated frames (e.g., images corresponding to consecutive times t0, t1, t2) of a same scene. In different implementations and depending on the type of objects being tracked by the object tracking system 200, the temporal separation may vary between each pair of time-consecutive frames within the set of frames 204 (e.g., less than one second, multiple seconds, minutes, hours, days).

The multiple object tracker 202 includes multiple processor-executed modules including an object detector 206, an appearance embedding network 208, a graph network 212, and a target matcher 216. Some implementations of the multiple object tracker 202 may include less than all of the modules shown in FIG. 2, other modules in lieu of one or more illustrated modules, or still other module in addition to the illustrated modules. Although the multi-object tracker 202 may be implemented in a single computing device, the software components of its associated modules may, in some implementations, be distributed for storage and/or execution across multiple devices and/or multiple different processing nodes of a cloud-based network.

Upon receipt of the frames 204, the object detector 206 performs image recognition to detect all objects appearing in each individual one of the frames 204 that satisfies some predefined criteria pertaining to object type. For example, all of the objects detected by the object detector 206 are of a same object type that are to be tracked by the multiple object tracker 202. In different implementations, target type may assume different forms including for example, people, animals, cars, etc.

The initial identification of each object instance (e.g., each "detection") may, in different implementations, be performed in different ways such as using various image recognition techniques. The object detector 206 detects (e.g., crops) a set of sub-images 220 from the frames 204 that each individually include a corresponding one of the identified detections. Thus, the sub-images 220 is also referred to in the following description as the "detections." In the illustrated implementation, the object detector 206 accomplishes this by defining a bounding box around each detection and extracting the sub-images 220 (A-G) such that each of the sub-images 220 consists of the pixels internal to one of the bounding boxes. In the illustrated example of FIG. 2, the object detector 206 identifies seven different instances of "person" across the three exemplary frames illustrated and assigns a unique index (e.g., alphabetical letters A-G in FIG. 2) to each instance of a person. Although multiple of these seven different detections (A-G) may, in actuality, correspond to a same target (e.g., detections B, E, and F all correspond to the same woman), the object detector 206 does not perform operations for target identification or clustering. Thus, the term "detection" is intended to refer to an instance of any of multiple unidentified targets within the scene.

The object detector 206 provides the individual detections (e.g., images A-G) to an appearance embedding network 208 which is, in one implementation, a convolutional neural network (CNN) that computes image embedding. Image embedding is the result of mapping a data of a high dimension (e.g., an array that corresponds to the size of the bounding box) to a lower dimensional representation. In this lower dimensional representation, each value indicates a weight associated with filters that represent distinguishing features of the CNN. The appearance embedding network 208 outputs an appearance embedding vector for each individual one of the detections (e.g., appearance embedding vectors 210). The embedding vectors are usable to compare visual similarities among the detections. For example, the appearance embedding vectors 210 may each be a 1×N vector.

In one implementation, visual similarity between two detections is assessed by taking the dot product of the associated two appearance embedding vectors. For example, if $e_{OA}$ is the appearance embedding vector for detection A and $e_{OB}$ is the appearance embedding vector for detection B, the dot product ($e_{OA}*e_{OB}$) may yield a value between −1 and 1, where 1 represents two images that are identical and −1 represents two images that are extremely different. In the following description, this metric is referred to as the "visual similarity metric."

Although some existing image tracking technologies do utilize visual similarity as a basis for target recognition and tracking, this approach can be problematic in a number of instances such as when visual similarity is used in a vacuum without temporal or spatial information. For example, it may be that two detections are nearly identical visually but that those two objects appear together in one of the frames 204. This fact suggests that the objects are in fact different despite their visual similarity. Likewise, two objects may appear very similar in appearance but appear at such dissimilar coordinate positions in consecutive frames so as to make it very unlikely that they correspond to the same object. The presently-disclosed tracking system is trained to utilize these types of spatial and temporal relationships to more accurately identify and track different objects.

To leverage these types of potential inferences that are gleaned from future and past detection characteristics of the same scene, the graph network 212 is employed to refine (modify) the appearance embedding vector of each detection based determined relationships (e.g., visual, temporal, and spatial relationships) between the associated detection and a subset of the detections from the same scene that are temporally separated from the detection. In one implementation, the graph network 212 is trained to make such modifications in a way that makes the appearance embedding vector of a detection more similar to the appearance embedding vector of other detections of the same real-world target while simultaneously making the appearance embedding vector more dissimilar to the appearance embedding vectors of other detections of the scene corresponding to different targets.

According to one implementation, the graph network 212 receives the appearance embedding vector of each detection (e.g., D1-D7) along with the detection's associated temporal information (e.g., timestamp of relevant frame) and spatial information, such as the dimensions of the bounding boxes and/or coordinate information defining the position of the detection within the corresponding one of the frames 204. For each one of the detections, the graph network 212 defines a graph (e.g., a graph 214) that is utilized to modify the appearance embedding vector for that detection based on determined relationships between the detection and other detections within the frame corresponding to different detection times. For example, the graph 214 illustrates example nodes (e.g., nodes 224, 226) with characteristics that may be used to modify the appearance embedding vector for a detection "D6."

Within the graph 214, each node includes vertices and edges. In one implementation, each vertex of the graph 214 is defined by the appearance embedding vector (referred to below as merely the "embedding") for an associated one of the detections. For example, the node 226 corresponding to detection D1 has a vertex defined by the appearance embedding vector $e_{0(D1)}$. The nodes of the graph 214 are further defined by edges that extend between each pair of vertices. Each edge may be understood as representing a set of edge properties representing determined relationships between the nodes connected by the edge. In one implementation, the edge properties for each edge are combined and collectively represented as a scalar referred to herein as an "edge weight." For example, an edge weight $E_{ij}$ may be a scalar value representing a distance between two vertices that correspond to the embeddings for detections with indices i and j, where $E_{ij}$ is based on a determined visual and spatial similarities of the detections i and j and a function realized through a training process, also referred to herein as "G" (the graph network 212).

In one implementation, the edge properties include the position offsets, size offsets, and similarity in appearance of the two detections i and j related by the edge. For example, an edge weight defining an edge between vertices corresponding to the embeddings for detections i and j may be represented by equation 1 below:

$$E_{ij} = G(\Delta x_{ij}, \Delta y_{ij}, \Delta w_{ij}, \Delta h_{ij}, \Delta t_{ij}, e_{0i} * e_{0j}) \quad (1)$$

where G is the graph network 212, $\Delta x_{ij}$ and $\Delta y_{ij}$ represent x and y coordinate offsets between the detections i and j (e.g., spatial offsets between the associated bounding boxes), $\Delta w_{ij}$ and $\Delta h_{ij}$ represent differences in width and height of the detections i and j (e.g., size differences between the associated bounding boxes), $\Delta t_{ij}$ represents the time differences between detections i and j, and $e_{0i} * e_{0i}$ is a dot product between the appearance embedding vectors for detections i and j (e.g., the visual similarity metric between the two). In one implementation, the edge weight assumes a scalar value (e.g., a lower value representing a weaker determined overall similarity between the associated detections than a higher value).

In the example of FIG. 2, the graph network 212 modifies the appearance embedding vector $(e_{0(D6)})$ for the detection D6 (e.g., $e_{0(D6)}$ is modified to become $e_0'_{(D6)}$) based on the learned function G (as defined with respect to equation 1 above) such that the resulting edge weights ($E_{Fj}$, where j the a node in a modification node set comprising at least the illustrated nodes D1, D2, D3, D4, D5), each increase in affinity for those edges corresponding to identical targets while simultaneously decreasing in affinity for those corresponding to non-identical real-world targets.

In one implementation, the function G appearing in Equation (1) (above) learned during a training process wherein the graph network 212 constructs graphs that include thousands of nodes representing detections corresponding to both identical and non-identical targets. For each pair of detections in the training set, the graph network 212 receives the values corresponding to spatial and visual characteristics (e.g., $\Delta x_{ij}$, $\Delta y_{ij}$, $\Delta w_{ij}$, $\Delta h_{ij}$, $\Delta t_{ij}$, $e_{0i} * e_{0j}$, as explained above) along with actual target ID data corresponding to the detection.

Using these inputs, the graph network G in equation (1) above is trained by minimizing a loss function designed to strengthen the edges between each detection and its positive candidates while weakening the edges between each detection and its negative candidates. For example, "positive candidates" may include the set of detections for which the associated visual similarity metric ($e_{0i} * e_{0j}$) is close to 1, with small temporal and spatial differences while negative candidates represent the set of detections for which the associated visual similarity metric is close to −1, and large temporal and spatial differences.

According to one implementation, the graph network 212 is trained throughout a process that minimizes a loss function that is based on a negative smooth maximum ($N_{smax}$) defined by equation 2 below and a positive smooth minimum ($P_{smin}$) defined by equation 3 below.

$$N_{smax} = \sum_{i,j \in [-]} \frac{dot_{ij} * e^{s*dot_{ij}}}{\sum_{i,j \in [-]} e^{s*dot_{ij}}} \quad (2)$$

$$P_{smin} = \sum_{i,j \in [+]} \frac{dot_{ij} * e^{-s*dot_{ij}}}{\sum_{i,j \in [+]} e^{-s*dot_{ij}}} \quad (3)$$

where "$dot_{ij}$" represents the dot product between the appearance embedding vectors of detections i and j (also referred to herein as the visual similarity metric), "[−] denotes the set of all pairs with a negative visual similarity metric, "[+] denotes the set of all pairs with a negative visual similarity metric and $s \in \mathcal{R}^1$, s>0.

From the above, losses are defined as by equations 4 and 5 below:

$$N_{loss} = -\log \frac{e^{-s*N_{smax}}}{e^{-s*N_{smax}} + \sum_{i,j \in [+]} e^{-s*dot_{ij}}} \quad (4)$$

$$P_{loss} = -\log \frac{e^{s*P_{smin}}}{e^{s*P_{smin}} + \sum_{i,j \in [-]} e^{s*dot_{ij}}} \quad (5)$$

such that total loss to be minimized is therefore defined by equation 6 below:

$$L = N_{loss} + P_{loss} \quad (6)$$

The exemplary graph 214 includes nodes that are each defined by a corresponding one of the detections D1-D7. In the illustrated example, the graph 214 includes a central node 2226 corresponding to the appearance embedding vector being modified (e.g., detection D7) and a set of connecting nodes.

To help clarify terminology, the subset of nodes used to modify the appearance embedding vector ($e_{0i}$) of another node is herein referred to as a "modification node set." Thus, in the illustrated example, the node being modified corresponding to detection F is modified by a modification node set including nodes corresponding to detections D1, D2, D3, D4, and D5 (e.g., collectively—nodes corresponding to the subjective past relative to the node being modified, D7). Notably, the illustrated examples have been simplified for illustration of concept. In some implementations, the modification node set includes nodes in addition to those shown in the examples herein. If, for example, node associated with a first time interval is modified based on its subject "future nodes" in a second time interval (discussed below), the modification node set may consist of those "future nodes" of the second time interval as well as all other nodes associated with the first time interval.

During actual post-training instances of multi-object tracking, the graph network 212 modifies of the appearance embedding vector ($e_{0i}$) for each different detection based on the learned function G and also based on the edge weights connecting the node being modified to each node in its associated modification node set. In general, the modification node set for each update includes nodes with detection times corresponding to a time interval that excludes the detection time of the node being modified. For example, the modification node set used to modify the $e_{0(D7)}$ value for detection D7 comprises a subset of detections that represent either the subjective past or the subjective future relative to the time of the detection D7. In the illustrated example, the modification node set includes nodes D1-D5 corresponding to detections that occur in the "subjective past" relative to the node being modified, D7 (e.g., detections D1-D5 are all detected in earlier frames of the scene than detection D7).

Although the specific methodology for selecting the modification node subset for each individual node modification may vary from one implementation to another, one suitable exemplary approach is explored in detail with respect to FIG. 3A-3B, below.

According to one implementation, the appearance embedding vector $e_{0i}$ for a detection 'i' is updated by the graph network 212 according to the following methodology:

$$e'_{0\,i} = e_{0i} + \sum_{j=1}^{N} (e_{0j} - e_{0i}) * E_{ij} \quad (7)$$

where 'i' is the detection corresponding to the appearance embedding vector being modified (e.g., the node being modified); 'j' is a modification node subset of size N (where i does not equal j); and $E_{ij}$ is the edge weight associated with detection i and detection j as defined by equation (1) above.

After updating the appearance embedding vectors 210 corresponding to each one of the detections (e.g., D1-D7) of the scene, the set of modified appearance embedding is output to a target matcher 216. In one implementation, the graph network 212 outputs an updated visual similarity metric (e.g., the dot product the final updated appearance embedding vectors) for every pair of detections, such as in the example illustrated with respect to FIG. 4. The target matcher 216 performs target clustering by sorting the detections into groups based on the associated modified appearance embedding vectors (e.g., the dot product between each pair) such that each one of the resulting sorted groups includes only the set of detections corresponding to a same real-world target. In the illustrated example, the target matcher 216 identifies that detections D1 and D3 correspond to a first target; detections D2, D5, and D6 correspond to a second target; and detections D4 and D7 correspond to a third target. In some implementations, the target matcher 216 performs non-maximum suppression and/or other clustering techniques in addition to those discussed herein.

It should be appreciated that the example of FIG. 2 is over-simplified for illustration of concept and that actual implementations of the multiple object tracker 202 may be adapted to use the same or similar methodology to track tens, hundreds, or thousands of targets in a scene by updating the appearance embedding vector for each target based on characteristics of a subset of modification nodes corresponding to a past or future time interval.

Figure 3A:
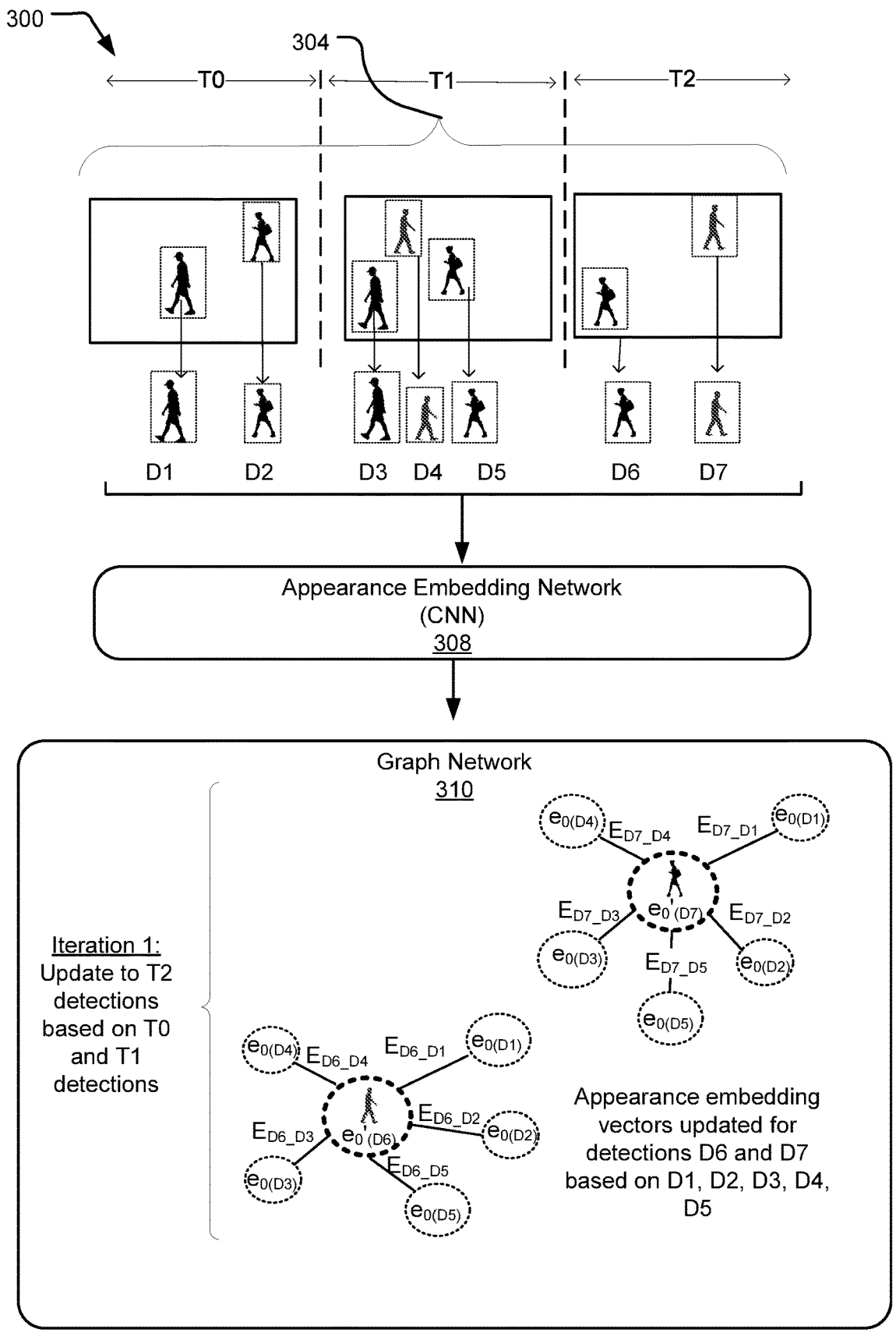
FIG. 3A illustrates a first update iteration performed by a graph network of a multi-target tracking system.
Figure 3B:
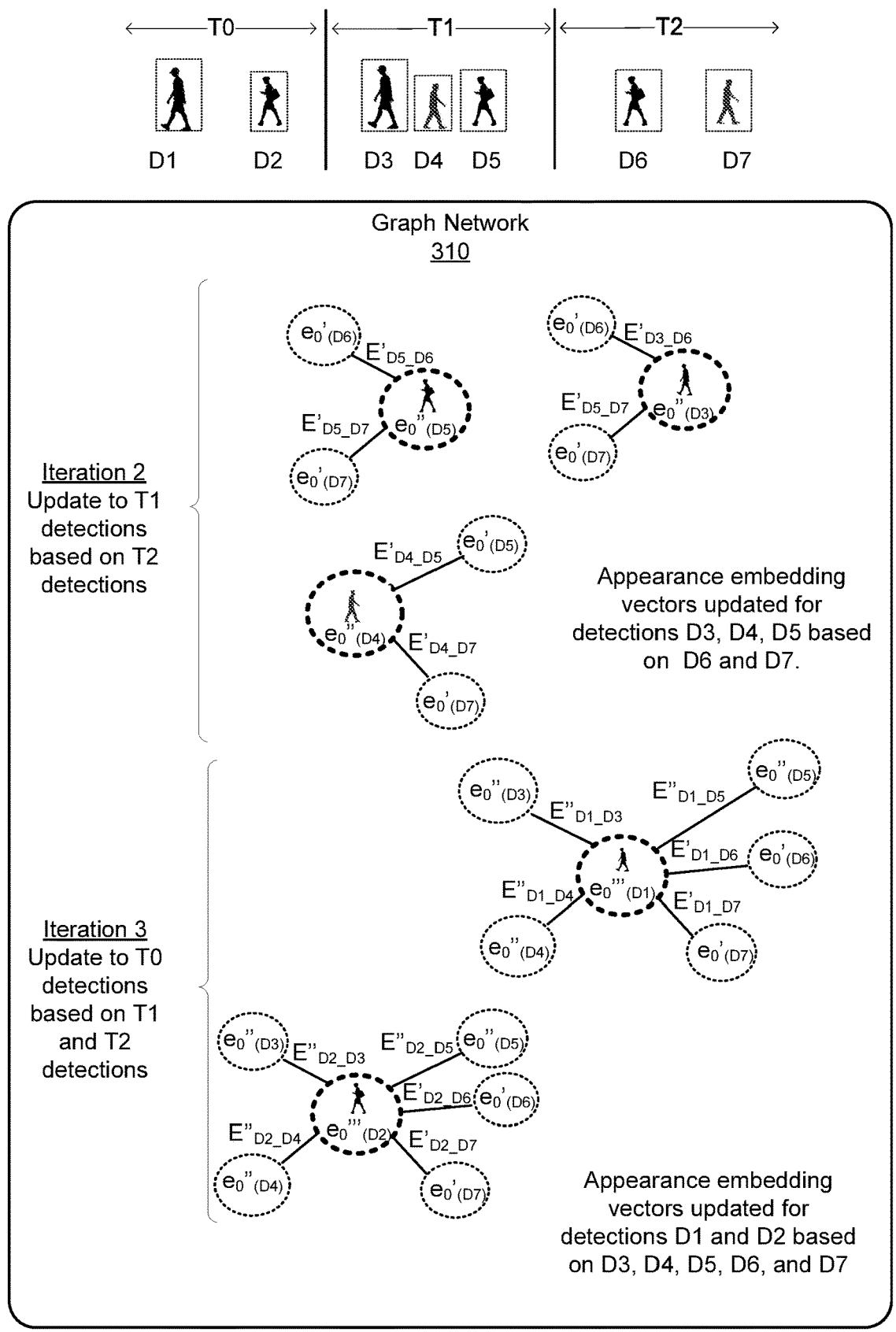
FIG. 3B illustrates second and third update iterations performed by the graph network of FIG. 3A.

FIGS. 3A-3B detail an exemplary sequence of operations that a graph network, such as the graph network 212 of FIG. 2, that may be performed to update the appearance embedding vector corresponding to each individual detection of a scene. In this example, the graph network performs three iterations of node updates. In the first iteration described with respect to FIG. 3A, a first subset of the graph nodes are individually updated based on a first modification node set; in the second iteration described with respect to FIG. 3B, a second subset of the graph nodes are updated based on a second modification node set; and in a third iteration also described with respect to FIG. 3B, a third and final subset of the graph nodes is updated based on a third modification node set.

FIG. 3A illustrates an exemplary first update iteration performed by a graph network 310 within a multi-object tracking system 300. The multi-object tracking system 300 includes at least an appearance embedding network 308 and a graph network 310. An object detector (not shown) receives a time-sequential set of frames 304. The object detector detects a set of detections (e.g. instances of objects) satisfying a defined set of criteria (e.g., objects are "people"), defines a bounding box around each detection (e.g., detections D1-D7), and crops each detection from the associated frame, as shown. The full set of detections corresponding to the time-sequential set of frames is input to the appearance embedding network 308.

The appearance embedding network 308 calculates an appearance embedding vector corresponding to each one of the detections (D1-D7), such as in a manner the same or similar to that described with respect to FIG. 2. These appearance embedding vectors are then provided to the graph network 212 along with edge properties for each possible pair of the detections. In one implementation, the edge properties provided to the graph network 310 include coordinate offsets of the two detections relative to one another within the scene (e.g., all frames may include the same frame of view), as well as size offsets in height and width, temporal differences (e.g. frame index or time stamp differences), and a visual similarity metric (e.g., the dot product between calculated appearance embedding vectors for the pair).

The graph network 310 defines a graph structure the same or similar to that described above with respect to FIG. 2 that includes nodes corresponding to each one of the detections (e.g., D1-D7), where the nodes are further modified by connecting nodes and their corresponding edges. In one implementation, each node is defined by the appearance embedding vector for the associated detection, while the edge weight between each pair of nodes is a scalar computed based on the properties for the pair and by the graph network 310 (e.g., as described above with respect to equation 1).

By example and without limitation, the graph network 310 performs three "update iterations" to compute the full set of modified appearance embedding vectors corresponding to all of the detections D1-D7. The embeddings of detections are, for the purpose of the iterative updates, divided into subsets of modification nodes (as described above) that correspond to three respective sub-intervals within the period of time encompassed by three scene. For clarity of concept in the following example, the time interval T1 may also be referred to as the "present," the time interval T0 as the "past" (e.g., the subjective past relative to the present), and the time interval T1 as the future (e.g., the subjective future relative to the present). FIG. 3A-3B pertain to a simplified example where the exists a single frame in the T0; a single frame in the T1 interval, and a single frame in the T2 interval. However, it should be understood that in actual implementations, there may exist multiple frames in each interval such that the detections of interval T0 are from multiple different frames spanning an early part of a scene; the detections of the time interval T1 are from multiple frames spanning a central part of a scene; and the detections of the time interval T2 are from multiple frames spanning a latter part of the scene.

During a first update iteration (denoted "Iteration 1" in FIG. 3A), the graph network 310 updates the appearance embedding vectors for all nodes that correspond to detections within the time interval T2 based on a subset of modification nodes that includes those nodes that correspond to the time intervals T0 and T1.

Specifically, the graph network 212 updates the appearance embedding vectors $e_{0(D6)}$ and $e_{0(D7)}$ corresponding to detections D6 and D7, respectively, yielding $e_0'_{(D6)}$ and $e_0'_{(D7)}$. Here, the modified vectors $e_0'_{(D6)}$ and $e_0'_{(D7)}$ are each computed based on the edges defined between the node being modified (D6 or D7) and each node in an associated modification node subset (e.g., D1, D2, D3, D4, and D5).

In one implementation, this first update iteration is performed according to equation (7), which is again:

$$e_0'_i = e_{0i} + \sum_{j=1}^{N}(e_{0j} - e_{0i}) * E_{ij}$$

where i does not equal j. Here, i represents the index of the node being modified and j represents the index of each node in the modification node subset. The appearance embedding vector $e_{0i}$ is updated based on the weighted node differences where the edge weights are computed by the graph network, as given by equation (1), above. After updating appearance embedding vectors $e_0'_i$ in this manner, the edge weights may again updated per equation 8 below and these values may be used in computing further updated vectors during a subsequent update iteration, discussed below with respect to FIG. 3B.

$$E'_{ij} = G(\Delta x_{ij}, \Delta y_{ij}, \Delta w_{ij}, \Delta h_{ij}, \Delta t_{ij}, e_0'_i * e_0'_j) \quad (8)$$

FIG. 3B illustrates second and third update iterations performed by the graph network 310 to facilitate better clustering detections (D1-D7) of corresponding to the frames 304, as described above with respect to FIG. 3A.

During the second iteration of update operations (denoted "Iteration 2" in FIG. 3B), the graph network 310 updates the appearance embedding vectors for all nodes that corresponding to the interval T1 based on a subset of modification nodes that includes nodes that correspond to the T2 interval. Here, the graph network 310 updates the appearance embedding vectors corresponding to detections D3, D4, and D5, respectively, now yielding $e_0''_{(D3)}$, $e_0''_{(D4)}$ and $e_0''_{(D5)}$. Here, the modified vectors $e_0''_{(D3)}$, $e_0''_{(D4)}$ and $e_0''_{(D5)}$ are each computed based on the edges defined between the node being modified (C, D, or E) and each node in a modification node subset including the nodes corresponding to detections in the T2 interval (e.g., D6 and D7). Notably, however, the nodes corresponding to the future were updated already during the first iteration described with respect to FIG. 3A. According to one implementation, this second update iteration is performed according to equation (9):

$$e_0''_i = e_0'_i + \sum_{j=1}^{N}(e_0'_j - e_0'_i) * E'_{ij} \quad (9)$$

where i represents the node being updated and j represents the index of the node in the associated modification node set. After updating appearance embedding vectors $e_0''_i$ in this manner, the edge weights may again be updated, per equation 10 below, and these updated edge weights may be used during a subsequent update iteration (e.g., third iteration), discussed below.

$$E''_{ij} = G(\Delta x_{ij}, \Delta y_{ij}, \Delta w_{ij}, \Delta h_{ij}, \Delta t_{ij}, e_0''_i * e_0''_i) \quad (10)$$

During the third iteration of update operations (denoted "Iteration 3"), the graph network 310 updates the appearance embedding vectors for all nodes that corresponding to the T0 interval based on a subset of modification nodes that now includes those nodes that correspond to the T1 and T1 intervals. Here, the graph network 310 updates the appearance embedding vectors $e_{0(D1)}$ and $e_{0(D2)}$ corresponding to detections D1 and D2. The modified vectors $e_0'''_{(D1)}$ and $e_0'''_{(D2)}$ are each computed based on the edges defined between the node being modified (D1 or D2) and each node in a subset of modification nodes corresponding to the detections in the "present" and "future" (e.g., D3, D4, D5, D6, and D7). Notably, however, the nodes corresponding to the present were updated in the second iteration and the nodes corresponding to the future were updated during the first iteration above.

According to one implementation, this third update iteration is performed according to equation (9):

$$e_0'''_i = e_0''_i + \sum_{j=1}^{N}(e_0''_j - e_0''_i) * E''_{ij} \quad (9)$$

Although other implementations of the disclosed technology may implement greater or fewer than the above-described three update iterations, this approach conveniently limits the number of iterations that must be computed while still offering a high degree of accuracy in most cases. Moreover, the order of update iterations described (e.g., updating (1) T2 interval nodes based on their subjective past (T0 and T1 interval nodes); (2) T1 interval nodes based on their subjective future (T1 interval nodes); and finally (3) T0 nodes based on their subjective future (T1 and T2 interval nodes) allows for updates to be implemented based on detections that happened in the past without creating an infinite dependency.

FIG. 4 illustrates exemplary table 400 generated based on actions performed by a graph network included within a multiple object tracking system. In one implementation, the table 400 is generated by the graph network 310 described with respect to 310. The table 400 includes columns and rows corresponding to the detections (e.g., D1-D7) detected within a time-sequential sequence of frames representing a single scene. For each detection, an appearance embedding network has computed an appearance embedding vector, as described with respect to the appearance embedding network 208 of FIG. 2.

Initially (e.g., prior to updates performed by the graph network), a visual similarity between any two of the detections can be initially assessed by computing the visual similarity metric for each detected pair based on the respective appearance embedding vectors. In one implementation, the visual similarity metric is given by the dot product between two of the appearance embedding vectors. This similarity metric may be understood as assuming a value in the range −1 to 1, where 1 represents a greatest degree of visual similarity and −1 indicates a lowest degree of visual similarity. Prior to operations performed by the graph network, the visual similarity metric between two detections is not usable to reliably indicate whether or not the two detections correspond to a same target. For example, two detections that are of a same target may have a low visual similarity metric of 0.20 or 0.30 when, in actuality, they are identical.

Once the graph network modifies the appearance embedding vector for each node as described above with respect to FIG. 1-3B, the visual similarity metric can be recomputed based on the modified appearance embedding vector values. The table 400 illustrates exemplary "final" visual similarity metrics for each pair of detections corresponding to a same scene. These updated visual similarity metrics are indicate, with a much higher degree of reliability than the original similarity metric, whether or not each pair of detections correspond to a same target.

These final visual similarity metrics are based on the modified appearance embedding vectors computed by the graph network for the detections D1-D7. For example, the similarity metric 402 represents the dot product between the modified appearance embedding vectors for detections D6 and D2 (e.g., $e_0'_{(D6)} * e_0'_{(D2)}$). Here, the exemplary visual similarity metric value of 0.99 indicates that D6 and D2 correspond to a same target.

From this table, it can be determined that detections D1 and D3 correspond to a same target; detections D2, D5, and D6 correspond to a same target, and detections D4 and D7 correspond to a same target. With this target identification, tracking is effectively achieved for each target across all frames of a scene.

Figure 5:
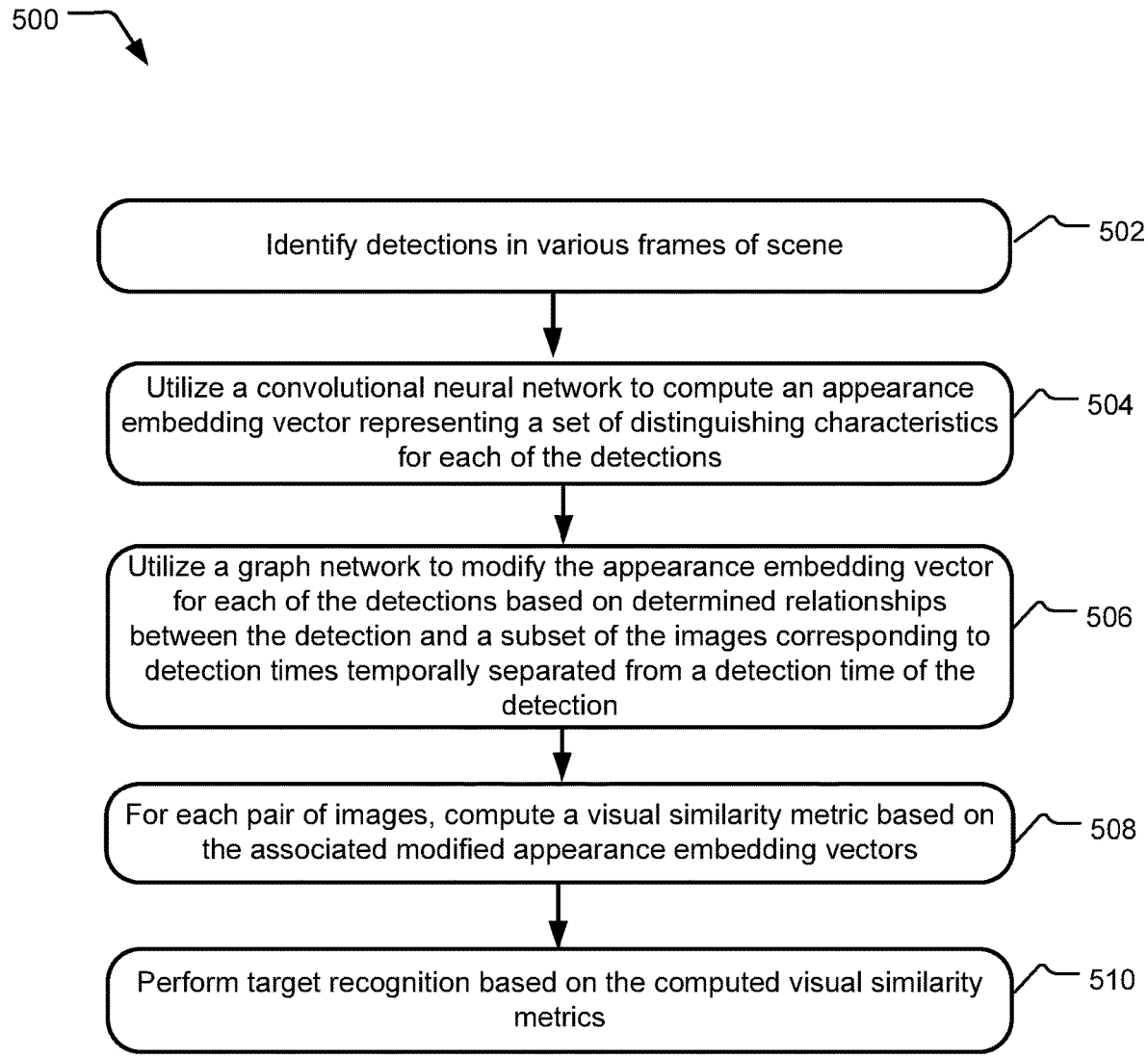
FIG. 5 illustrates example operations for simultaneously tracking multiple objects in a scene.

FIG. 5 illustrates example operations for simultaneously tracking multiple objects in a scene. A detection identification operation 502 analyzes a set of frames forming a scene, and detects instances of objects appearing within the different frames that satisfy detection criteria. The). detection criteria may be vary depending on the specific purpose to for which the operations 500 are being performed. In some implementations, the detection criteria define a type of object (people, cars, etc.). In one implementation, the detection operation 502 includes defining a bounding box around each of the detected objected instances throughout the set of frames and extracting the images internal to each of the defined bounding boxes.

An embedding operation 504 utilizes a convolutional neural network to compute an appearance embedding vector representing a set of distinguishing characteristics for each one of the extracted images.

A modification operation 506 utilizes a graph network to modify the appearance embedding vector for each of the extracted images based on determined relationships (e.g., spatial offsets, visual similarity, size offsets) between the image and a subset of the images corresponding to detection times representing either the subjective past or the subjective future relative to the detection time of the image.

A visual similarity computation operation 508 computes a visual similarity metric for each pair of the images based on the associated modified appearance embedding vectors. A target recognition operation 510 performs target recognition by sorting the images into groups based on the associated modified appearance embedding vectors, each one of the groups including a subset of the images corresponding to a same target.

Figure 6:
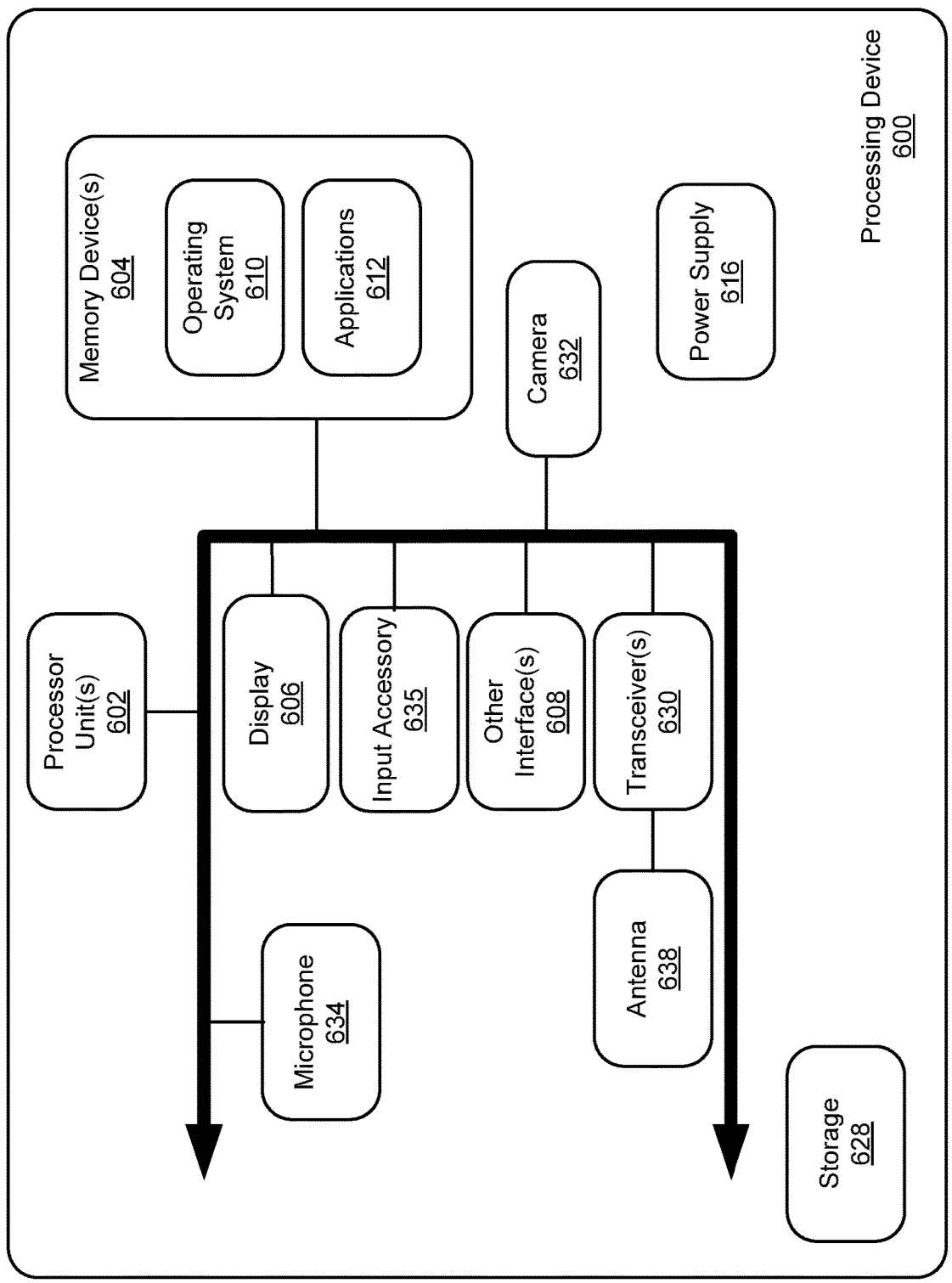
FIG. 6 illustrates an example schematic of a processing device suitable for implementing aspects of the disclosed technology.

FIG. 6 illustrates an example schematic of a processing device 600 suitable for implementing aspects of the disclosed technology. The processing device 600 includes one or more processor unit(s) 602, memory 604, a display 606, and other interfaces 608 (e.g., buttons). The processor unit(s) 602 may include one or more CPUs, GPUs, and artificial intelligence (AI) accelerators (e.g., microchips designed to enable faster processing of AI tasks). In one implementation, the appearance embedding network (208 of FIG. 2) and/or the graph network (212 of FIG. 2) are embodied at least partially in software that is executed by one or more AI accelerators or GPUs.

The memory 604 generally includes both volatile memory (e.g., RAM) and non-volatile memory (e.g., flash memory). An operating system 610, such as the Microsoft Windows® operating system, the Microsoft Windows® Phone operating system or a specific operating system designed for a gaming device, resides in the memory 604 and is executed by the processor unit(s) 602, although it should be understood that other operating systems may be employed.

One or more applications 612, such as the multiple object tracker 102 of FIG. 1, are loaded in the memory 604 and executed on the operating system 610 by the processor unit(s) 602. Applications 612 may receive input from various input local devices such as a microphone 634, input accessory 635 (e.g., keypad, mouse, stylus, touchpad, gamepad, racing wheel, joystick), and a camera 632 (e.g., to provide the multiple object tracker with footage of a scene). Additionally, the applications 612 may receive input from one or more remote devices, such as remotely-located smart devices, by communicating with such devices over a wired or wireless network using more communication transceivers 630 and an antenna 638 to provide network connectivity (e.g., a mobile phone network, Wi-Fi®, Bluetooth®). The processing device 600 may also include various other components, such as a positioning system (e.g., a global positioning satellite transceiver), one or more accelerometers, one or more cameras, an audio interface (e.g., the microphone 634, an audio amplifier and speaker and/or audio jack), and storage devices 628. Other configurations may also be employed.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources. In an example implementation, a multi-object tracker (e.g., 202 of FIG. 2) may include hardware and/or software embodied by instructions stored in the memory 604 and/or the storage devices 628 and processed by the processor unit(s) 602. The memory 604 may be the memory of a host device or of an accessory that couples to the host.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language An example system disclosed herein includes a convolutional neural network, a graph network, and a target matcher that are each stored in the memory executable by one or more processors. The convolutional neural network receives a set of detections of a scene, each detection being an image extracted from a corresponding frame in a set of frames spanning a time interval and corresponding to a detected instance of one of multiple objects. For each received detection, the convolutional neural network computes an appearance embedding vector defining a set of distinguishing characteristics for the detection. The Graph network modifies the appearance embedding vector for each detection based on determined relationships between the detection and a subset of the detections corresponding to detection times temporally separated from a detection time of the detection. The target matcher performs target clustering by sorting the detections into groups based on the associated modified appearance embedding vectors, each one of the groups including a subset of the detections corresponding to a same target.

In one example system of any preceding system, the graph network is trained to modify the appearance embedding vector for each detection based on characteristics including one or more of spatial separation, temporal separation, and visual similarity between the detection and each detection of the subset of detections.

In another example system of any preceding system, the graph network is defined by vertices and edges. Each of the vertices is defined by the appearance embedding vector for an associated one of the detections, and each of the edges is defined by least one of a spatial separation, temporal separation, and visual similarity of between a pair of the detections associated with vertices connected by the edge.

In another example system of any preceding system, each one of the edges is a scalar value that depends on a function derived during training of the graph network.

In still another example system of any preceding system, function depends on spatial separation, temporal separation, and visual similarity of each of multiple pairs of training images, each of the pairs of training images including detections that correspond to different detection times.

In still another example system of any preceding system, the graph network modifies the appearance embedding vector for each detection based on a detection time corresponding to the detection such that (1) the appearance embedding vectors of a first subset of detections are updated based on the vertices and edge properties corresponding to a second subset of detections associated with detection times earlier than the detection times of the detections of the first subset; and (2) the appearance embedding vectors of the second subset of detections are updated based on the vertices and edge properties corresponding to a third subset of detections associated with detection times later than the detection times of the detections of the second subset.

In still another example system of any preceding system, the target matcher performs target clustering by computing a dot product between each pair of the modified appearance embedding vectors.

In another example system of any preceding system, the system further comprises a detection module executable to analyze the set of frames and detect instances of objects each appearing in one or more of the frames; define a bounding box around each one of the detected instances of one of the objects; and extract images internal to each of the defined bounding boxes, the extracted images forming the set of detections received by the convolutional neural network.

An example method disclosed herein provides for receiving a set of detections of a scene, each detection being an image extracted from a corresponding frame in a set of frames spanning a time interval and corresponding to a detected instance of one of multiple objects; computing, for each detection of the set, an appearance embedding vector defining a set of distinguishing characteristics for the detection; modifying the appearance embedding vector for each detection based on determined relationships between the detection and a subset of the detections corresponding to detection times temporally separated from a detection time of the detection; computing a visual similarity metric for each pair of detections within the set, the visual similarity metric being based on the modified appearance embedding vectors associated with the pair; and performing target clustering based on the computed visual similarity metrics, the target clustering identifying subsets of detections that correspond to identical targets within the scene.

In still another example method of any preceding method, modifying the appearance embedding vector for each detection further comprises modifying the appearance embedding vector for each detection based on characteristics including one or more of spatial separation, temporal separation, and visual similarity between the detection and each detection of the subset of detections relative to the detection.

In yet still another example method of any preceding method, modifying the appearance embedding vector for each detection further comprises utilizing a graph network to modify the appearance embedding vector for each detection, the graph network including vertices each defined by the appearance embedding vector for an associated one of the detections and edges each defined by at least one of a spatial separation, temporal separation, and visual similarity between the detection and each detection of the subset of detections.

In one example method of any preceding method, each one of the edges is a scalar value that depends on a function derived during training of the graph network.

In another example method of any preceding method, the function depends on spatial separation, temporal separation, and visual similarity of each of multiple pairs of training images, each of the pairs of training images including detections that correspond to different detection times.

In yet still another example method of any preceding method, modifying the appearance embedding vector for each detection further comprises modifying the appearance embedding vector for each detection based on a detection time corresponding to the detection such that: (1) the appearance embedding vectors of a first subset of detections are updated based on the vertices and edge properties corresponding to a second subset of detections associated with detection times earlier than the detection times of the detections of the first subset; and (2) the appearance embedding vectors of the second subset of detections are updated based on the vertices and edge properties corresponding to a third subset of detections associated with detection times later than the detection times of the detections of the second subset.

In yet still another example method of any preceding method, performing target clustering further comprises computing a dot product between each pair of the modified appearance embedding vectors.

In yet still another example method of any preceding method, the method further comprises: analyzing the set of frames and detect instances of objects each appearing in one or more of the frames; defining a bounding box around each one of the detected instances of one of the objects; and extracting images internal to each of the defined bounding boxes, the extracted images forming the set of detections for which the appearance embedding vector are subsequently computed.

One example memory device disclosed herein encodes processor-readable instructions for executing a computer process comprising defining a set of detections such that each detection includes an image extracted from a corresponding frame in a set of frames spanning a time interval and corresponding to a detected instance of one of multiple objects. The computer process further comprises computing, for each detection of the set, an appearance embedding vector defining a set of distinguishing characteristics for the detection; modifying the appearance embedding vector for each detection based on determined relationships between the detection and a subset of the detections corresponding to detection times temporally separated from a detection time of the detection; computing a visual similarity metric for each pair of detections within the set, the visual similarity metric being based on the modified appearance embedding vectors associated with the pair; and performing target clustering based on the computed visual similarity metrics, the target clustering being effective to identify subsets of detections that correspond to identical targets.

In still another memory device of any preceding memory device, the processor-executable instructions further comprise modifying the appearance embedding vector for each detection based on characteristics including one or more of spatial separation, temporal separation, and visual similarity between the detection and each detection of the subset of detections relative to the detection.

In yet still another example memory device of any preceding memory device, the processor-executable instructions still further comprise modifying, with a graph network, the appearance embedding vector for each detection, the graph network having vertices each defined by the appearance embedding vector for an associated one of the detections and also having edges each defined by at least one of a spatial separation, temporal separation, and visual similarity between the detection and each detection of the subset of detections.

In yet still another example memory device of any preceding memory device, the graph network includes edges each represented by a scalar value that depends on a function derived during training of the graph network.

Another example system disclosed herein includes a means receiving a set of detections of a scene, each detection being an image extracted from a corresponding frame in a set of frames spanning a time interval and corresponding to a detected instance of one of multiple objects. The system further comprises a means for computing, for each detection of the set, an appearance embedding vector defining a set of distinguishing characteristics for the detection. The system still further comprises a means for modifying the appearance embedding vector for each detection based on determined relationships between the detection and a subset of the detections corresponding to detection times temporally separated from a detection time of the detection and a means for computing a visual similarity metric for each pair of detections within the set, the visual similarity metric being based on the modified appearance embedding vectors associated with the pair. The system still further comprises a means for performing target clustering based on the computed visual similarity metrics, the target clustering identifying subsets of detections that correspond to identical targets within the scene.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A system comprising:
   memory;
   a convolutional neural network stored in the memory executable by one or more processors to:
      receive a set of detections of a scene, each detection being an image extracted from a corresponding frame in a set of frames spanning a time interval and corresponding to a detected instance of one of multiple objects;
      compute, for each detection of the set, an appearance embedding vector defining a set of distinguishing characteristics for the detection; and
   a graph network stored in the memory and executable by the one or more processors to modify the appearance embedding vector for each detection based on determined relationships between the detection and a subset of the detections corresponding to detection times temporally separated from a detection time of the detection; and
   a target matcher stored in the memory and executable by the one or more processors to perform target clustering by sorting the detections into groups based on the associated modified appearance embedding vectors, each one of the groups including a subset of the detections corresponding to a same target.

2. The system of claim 1, wherein the graph network is trained to modify the appearance embedding vector for each detection based on characteristics including one or more of spatial separation, temporal separation, and visual similarity between the detection and each detection of the subset of detections.

3. The system of claim 1, wherein the graph network is defined by vertices and edges, each of the vertices being defined by the appearance embedding vector for an associated one of the detections, and each of the edges being defined by least one of a spatial separation, temporal separation, and visual similarity of between a pair of the detections associated with vertices connected by the edge.

4. The system of claim 3, wherein each one of the edges is a scalar value that depends on a function derived during training of the graph network.

5. The system of claim 4, wherein the function depends on spatial separation, temporal separation, and visual similarity of each of multiple pairs of training images, each of the pairs of training images including detections that correspond to different detection times.

6. The system of claim 3, wherein the graph network modifies the appearance embedding vector for each detection based on a detection time corresponding to the detection such that:
   the appearance embedding vectors of a first subset of detections are updated based on the vertices and edge properties corresponding to a second subset of detections associated with detection times earlier than the detection times of the detections of the first subset; and
   the appearance embedding vectors of the second subset of detections are updated based on the vertices and edge properties corresponding to a third subset of detections associated with detection times later than the detection times of the detections of the second subset.

7. The system of claim 1, wherein the target matcher performs target clustering by computing a dot product between each pair of the modified appearance embedding vectors.

8. The system of claim 1, further comprising:
   a detection module stored in the memory and executable by the one or more processors to:
      analyze the set of frames and detect instances of objects each appearing in one or more of the frames;
      define a bounding box around each one of the detected instances of one of the objects;
      extract images internal to each of the defined bounding boxes, the extracted images forming the set of detections received by the convolutional neural network.

9. A method comprising:
   receiving a set of detections of a scene, each detection being an image extracted from a corresponding frame in a set of frames spanning a time interval and corresponding to a detected instance of one of multiple objects;
   computing, for each detection of the set, an appearance embedding vector defining a set of distinguishing characteristics for the detection;
   modifying the appearance embedding vector for each detection based on determined relationships between the detection and a subset of the detections corresponding to detection times temporally separated from a detection time of the detection;
   compute a visual similarity metric for each pair of detections within the set, the visual similarity metric being based on the modified appearance embedding vectors associated with the pair; and
   performing target clustering based on the computed visual similarity metrics, the target clustering identifying subsets of detections that correspond to identical targets within the scene.

10. The method of claim 9, wherein modifying the appearance embedding vector for each detection further comprises:
    modifying the appearance embedding vector for each detection based on characteristics including one or more of spatial separation, temporal separation, and visual similarity between the detection and each detection of the subset of detections relative to the detection.

11. The method of claim 9, wherein modifying the appearance embedding vector for each detection further comprises:

utilizing a graph network to modify the appearance embedding vector for each detection, the graph network including vertices each defined by the appearance embedding vector for an associated one of the detections and edges each defined by at least one of a spatial separation, temporal separation, and visual similarity between the detection and each detection of the subset of detections.

12. The method of claim 11, wherein each one of the edges is a scalar value that depends on a function derived during training of the graph network.

13. The method of claim 12, wherein the function depends on spatial separation, temporal separation, and visual similarity of each of multiple pairs of training images, each of the pairs of training images including detections that correspond to different detection times.

14. The method of claim 11, wherein modifying the appearance embedding vector for each detection further comprises modifying the appearance embedding vector for each detection based on a detection time corresponding to the detection such that:
the appearance embedding vectors of a first subset of detections are updated based on the vertices and edge properties corresponding to a second subset of detections associated with detection times earlier than the detection times of the detections of the first subset; and
the appearance embedding vectors of the second subset of detections are updated based on the vertices and edge properties corresponding to a third subset of detections associated with detection times later than the detection times of the detections of the second subset.

15. The method of claim 9, wherein performing target clustering further comprises:
computing a dot product between each pair of the modified appearance embedding vectors.

16. The method of claim 9, further comprising:
analyze the set of frames and detect instances of objects each appearing in one or more of the frames;
defining a bounding box around each one of the detected instances of one of the objects; and
extracting images internal to each of the defined bounding boxes, the extracted images forming the set of detections for which the appearance embedding vector are subsequently computed.

17. One or more memory devices encoding processor-executable instructions for executing a computer process comprising:
defining a set of detections, each detection being an image extracted from a corresponding frame in a set of frames spanning a time interval and corresponding to a detected instance of one of multiple objects;
computing, for each detection of the set, an appearance embedding vector defining a set of distinguishing characteristics for the detection;
modifying the appearance embedding vector for each detection based on determined relationships between the detection and a subset of the detections corresponding to detection times temporally separated from a detection time of the detection;
computing a visual similarity metric for each pair of detections within the set, the visual similarity metric being based on the modified appearance embedding vectors associated with the pair; and
performing target clustering based on the computed visual similarity metrics, the target clustering being effective to identify subsets of detections that correspond to identical targets.

18. The one or more memory devices of claim 17, wherein modifying the appearance embedding vector for each detection further comprises:
modifying the appearance embedding vector for each detection based on characteristics including one or more of spatial separation, temporal separation, and visual similarity between the detection and each detection of the subset of detections relative to the detection.

19. The one or more memory devices of claim 17, wherein modifying the appearance embedding vector for each detection is performed using a graph network with vertices and edges, the vertices each being defined by the appearance embedding vector for an associated one of the detections, the edges each being defined by at least one of a spatial separation, temporal separation, and visual similarity between the detection and each detection of the subset of detections.

20. The one or more memory devices of claim 19, wherein each one of the edges is a scalar value that depends on a function derived during training of the graph network.

* * * * *